May 17, 1955 G. DALL'OLIO CONTRI 2,708,743
DUAL TIRE SIGNAL DEVICE
Filed Dec. 29, 1949
3 Sheets-Sheet 1
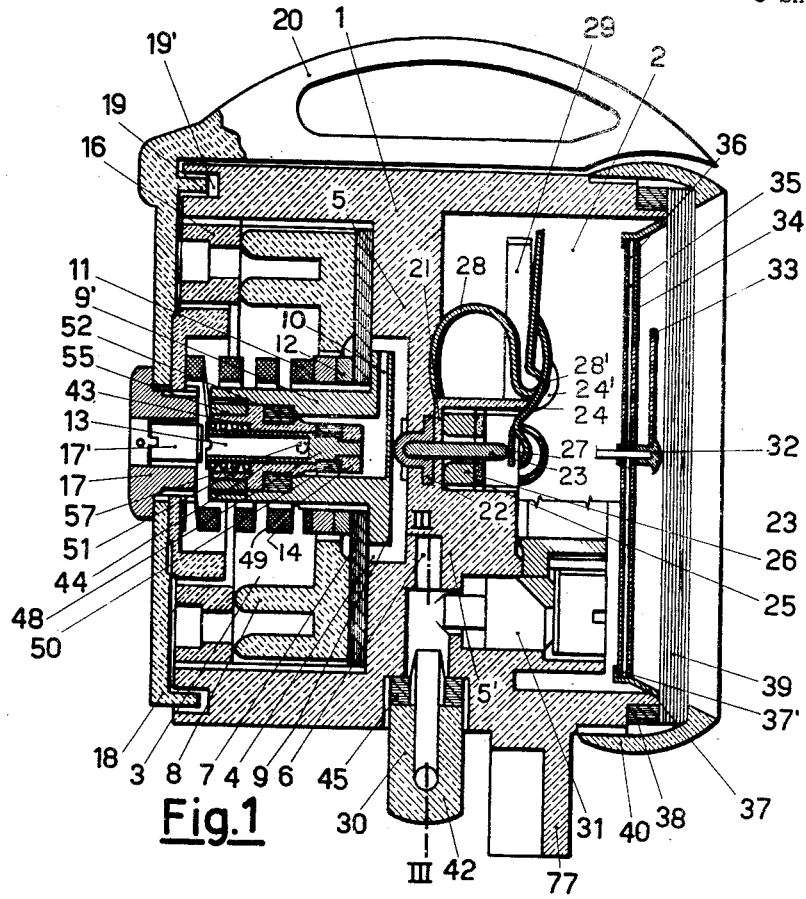
Fig. 1
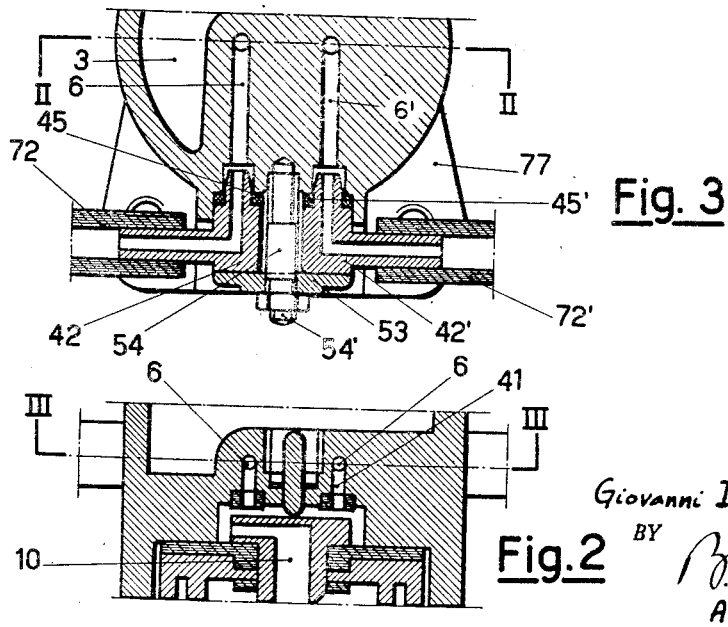
Fig. 3
Fig. 2
INVENTOR.
Giovanni Dall'Olio Contri
BY
*[signature]*
Attorney May 17, 1955  G. DALL'OLIO CONTRI  2,708,743
DUAL TIRE SIGNAL DEVICE
Filed Dec. 29, 1949  3 Sheets-Sheet 2

INVENTOR.
Giovanni Dall'Olio Contri
BY
Attorney

May 17, 1955 G. DALL'OLIO CONTRI 2,708,743
DUAL TIRE SIGNAL DEVICE
Filed Dec. 29, 1949 3 Sheets-Sheet 3
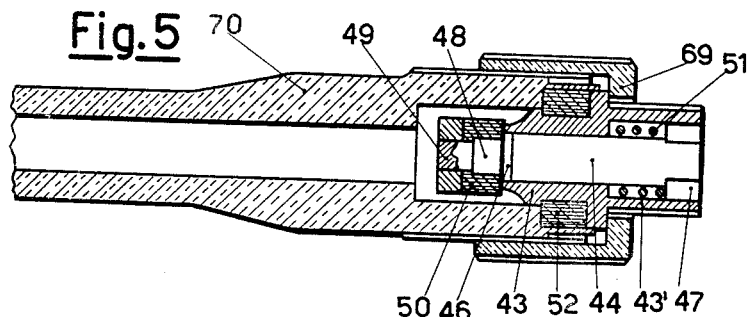
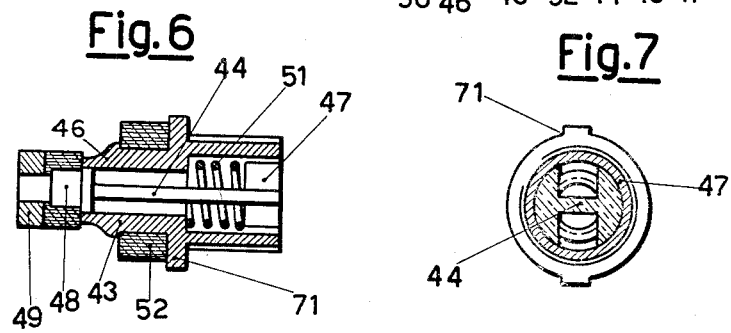
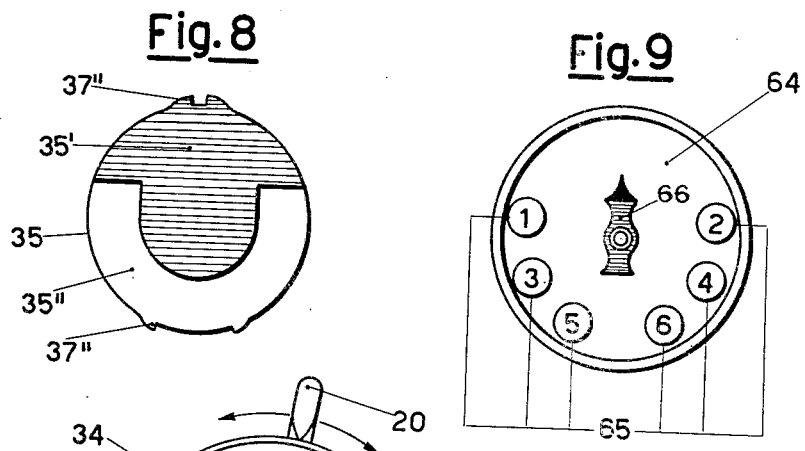
INVENTOR.
Giovanni Dall'Olio Contri
BY
Attorney

---

United States Patent Office 2,708,743
Patented May 17, 1955

---

2,708,743

DUAL TIRE SIGNAL DEVICE

Giovanni Dall'Olio Contri, Brescia, Italy

Application December 29, 1949, Serial No. 135,690

2 Claims. (Cl. 340—58)

The present invention relates to a control and alarm device for indicating when either or both tires of a dual tire wheel of a truck, semi-trailer, trailer, or omnibus have lost a predetermined, desired air pressure.

One object of the present invention is to provide a control and signal device of the nature described which normally connects the inner tubes of the two tires and which will automatically break this connection in case the pressure in either or both tires drops below the desired pressure.

A further object of the invention is to provide a control and alarm device of the character described through which the tire, that loses pressure, is disconnected immediately from the other tire, and through which a visible or audible signal may be given of the loss of pressure.

Another object of the invention is to provide a device of the character described through which it can be determined which of the dual tires has lost pressure.

Another object of the invention is to provide a device of the character described with which a visible signal may be given the driver in case loss of pressure occurs when the vehicle is moving and with which an audible signal, in addition to the visible signal, may be provided if loss of pressure occurs while the vehicle is parked.

A further object of the invention is to provide a control and alarm device of the character described which will permit of adjusting at will the predetermined air pressure that is to exist in the tubes of the two tires connected to the device so that an alarm may be given as soon as the pressure in either of the tires falls below the desired predetermined pressure.

A still further object of the invention is to provide a control and alarm device of the character described in which the signal indicating loss of pressure is effected through an electrical circuit, and in which the contacts of this circuit are enclosed within an air-tight chamber of the device, thereby fully protecting the contacts under the severe conditions which are likely to be encountered in operation on a wheel of a truck or the like.

Other objects of the invention will be apparent hereinafter from the specification and from the recital of the appended claims.

In the drawings:

Fig. 1 is an axial section through a device constructed according to one embodiment of this invention;

Fig. 2 is a section on a smaller scale taken on the line II—II of Fig. 3;

Fig. 3 is a section on the same scale as Fig. 2 taken along the line III—III of Figs. 1 and 2;

Fig. 5 is an axial section showing one form of valve through which the air tube of one of the tires of the vehicle is connected to the control and signal device of the present invention;

Fig. 6 is an axial section through this valve taken at right angles to the section of Fig. 5;

Fig. 7 is a front view of this valve;

Fig. 8 is a detail view of part of the indicator of the control device;

Fig. 9 is a diagrammatic front view showing a visible signalling device which may be mounted in the driver's cab of the vehicle, and operated by the control and alarm device of the present invention; and Fig. 10 is a front view of the apparatus shown in Fig. 1 showing the indicating dial with which it is provided.

Figure 4:
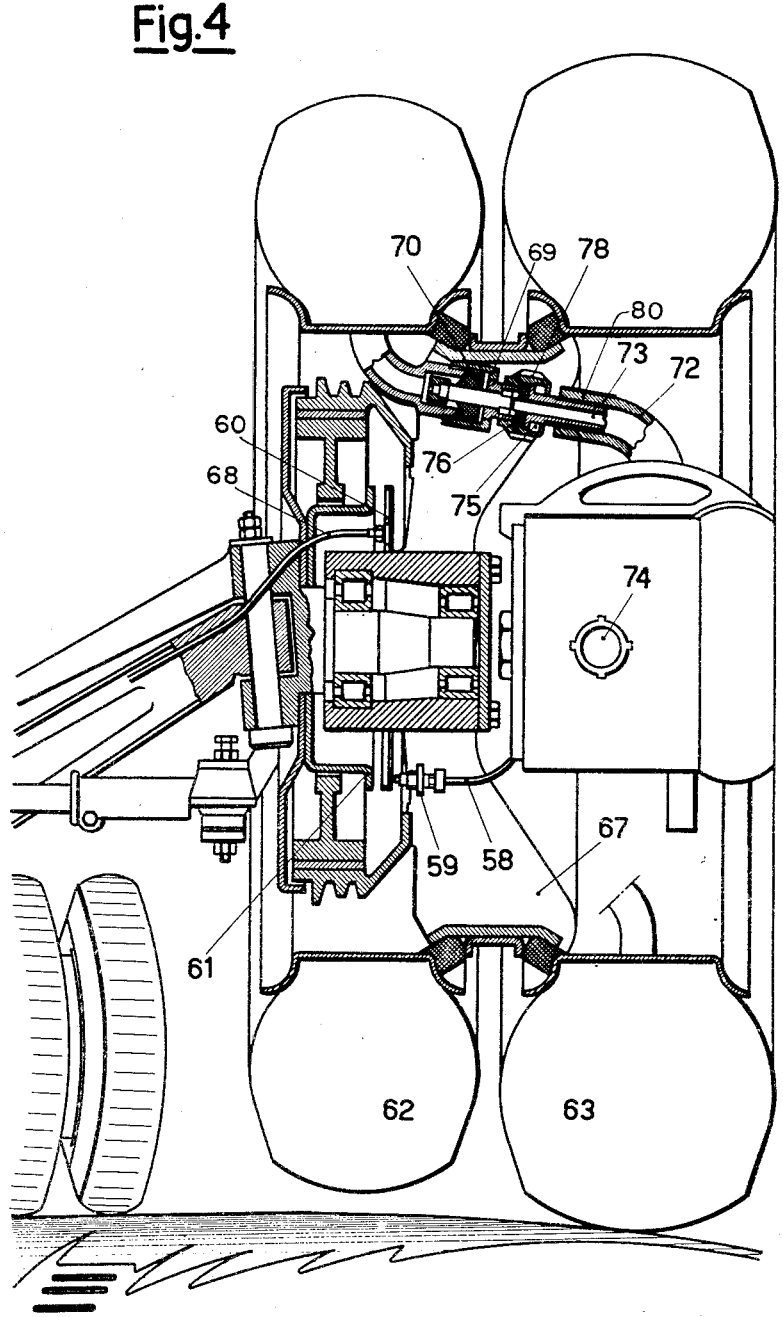
Fig. 4 is a fragmentary section of the right hand part of the front steering axle of a vehicle having dual tire wheels and having mounted thereon a control and alarm device built according to this invention.

Referring now to the drawings by numerals of reference, the device comprises a cylindrical housing 1 having a bottom extension 77 thereon for securing it to one of the dual wheels of a vehicle. In the housing 1 there are provided a chamber 3, and a sealed chamber 2 which is separated from the chamber 3 by a wall 5. There are two ducts 6 and 6' (Figs. 1 and 3) in the wall 5 which communicate at one end with the chamber 3 and at their opposite ends with right angular fittings 30 that are adapted to be connected by means of hoses 72 and 72', respectively, with the two tires 62 and 63 (Fig. 4), respectively, with which the device of the present invention is to be used.

In the chamber 3 there is a flexible annular diaphragm 7, the radially outer portion of which is kept in sealed contact with the wall 5 by a metal ring 8. This ring is in turn held seated by a ring 16 which threads into the chamber 3. The diaphragm 7 engages around its bore with the circular head of a headed member 9 which bears against the diaphragm at the opposite side from the ring 8 and which has a cylindrical axial stem portion 9'. The diaphragm is secured between a washer 12 and the headed member 9 by a nut 11 which threads onto the stem 9'. The washer 12 is mounted on the stem 9' of the member 9.

There is a right angular duct 10 provided in the head of the member 9. This duct communicates with the space 4 in the wall 5 into which the head of the member 9 projects and which is closed by the diaphragm 7. The duct 10 serves to connect the space 4 with the outside of the control device. This duct 10 is normally closed by a valve 13 which is mounted in one arm of the duct 10. When there is excess of pressure in the tires the excess pressure will open the valve 13 and permit air to discharge from the chamber 4 to the outside air, thereby reducing the pressure in the tires to the desired, predetermined pressure.

A heavy helical spring 14 is interposed between the nut 11 and a seat 15 which is threadably secured to the ring 16. This spring serves to flex the diaphragm inwardly to cause the head of member 9 to shut off communication between the ducts 6 and 6' that are connected to the two tires. The ring 16, in turn, is threaded into the inside wall of the chamber 3. A bored nut or plug 17 screws into the ring 15. This nut is fixedly secured to a cap 18 which closes the rear end of the chamber 3. This disc is provided with an annular flange 19 which is adapted to engage in a circular groove 19' provided in the rear face of the housing 1. Integral with the cap 18 is an arm 20 which is provided with a hand grip by means of which the cap 18 can be rotated to control and adjust the compression of the spring 14. This arm 20 may terminate at the front with a bill-shaped portion (Fig. 10) serving as a pointer for reading the amount of adjustment of the cap member.

Into the bored nut 17 there is screwed a plug 17' whose position is adjustable to adjust the axial position of the stem of the valve 13. If the plug 17' is advanced in its seat 17 the valve 13 is opened correspondingly, discharging air and diminishing the pressure inside the chamber 4 and inside the tires.

There is a hole in the wall 5 coaxial with the stem of the headed member 9. In this hole there is mounted a cup 21 made of rubber or other resilient material and provided with a fastening flange that is secured to the wall 5 in such manner that the bottom of the cup projects slightly through the hole into the inside of the chamber 4. Against the flange of the cup 21 there bears an annular disc 22 which has an axially projecting arm 24 that has its outer end 24' bowed and furcated. The disc 22 is secured to a thickened portion 5' of the wall 5 by means of a nut 25 and a lock-nut 26. A rod 23 passes axially through the disc 22, the nut 25 and the lock nut 26, and bears at one end against the bottom of the elastic cup 21. At its opposite end this stem projects beyond the lock-nut 26 and bears against the shorter arm of a rocker lever 27 which is pivoted between the arms of the fork 24'. A spring 28, whose shape is shown in Fig. 1, rests at one end on a seat in the wall 5 and at its upper end bears against the longer arm of the rocker 27. This spring acts through the rocker 27 to keep the rod 23 in contact with the bottom of the cup 21.

In the sealed chamber 2 of the device there is provided a pressure gauge 31 which may be of conventional construction and which is indicated diagrammatically. This gauge is in communication with the duct 6 that connects one of the tires with the chamber 3. Its purpose is to indicate the pressure in the chamber 3 as well as the pressure in the air tube of the tire that is connected to the duct 6 if the connection between this air tube and the chamber 3 is interrupted. The pressure gauge is connected operatively with a shaft 32 that carries an index pointer 33.

This pointer is adapted to read against a dial consisting of three superimposed discs 34, 35 and 36. The front disc 34 is provided with perforated graduations as clearly shown in Fig. 10; and the position of the arm 20 is read against the upper set of these graduations of the disc 34. The intermediate disc 35 (Fig. 8) is of transparent material. The portion 35' of it is covered, however, with colored paint while the remaining part $35^2$ of it is coated on its rear face with phosphorescent paint. The rear disc 36 is of transparent material and protects the paint layer applied on the disc 35. The numerals provided by the perforations in the lower part of the front disc 34 will thus be readable even at night, since the phosphorescent paint will shine through the perforations that form these numerals. The three superimposed discs are secured together and held in place by tongues 37' (Fig. 1) provided in the conical cover 34 and which engage shoulders $37^2$ (Fig. 8) formed on the discs. The cover 34 constitutes a front closure for the sealed chamber 2. This cover is threaded externally onto the cylindrical body of the housing 1 and it is provided with a transparent disc 39 and with a packing ring 38 accommodated in a suitable seat.

From Fig. 2 it will be seen that the inside ends of the ducts 6 and 6', which open into the chamber 4, are provided with small packing rings 41 which serve to insure tight fit of the head of member 9 against the ends of said ducts if member 9, owing to diminished pressure in the chamber 4, is forced by spring 14 against the ends of the two ducts 6 and 6'. Thereby the connection between the air tubes of the dual tires is broken. From Fig. 3 it will be seen that fittings 42 and 42' are secured in an air tight manner to the outside ends of the ducts 6 and 6'. Packing rings 45 and 45' (Figs. 1 and 3) are mounted in convenient seats in the mouths of the ducts 6 and 6'. The fittings 42 and 42' are secured in place by means of a clamping plate 53. This plate is secured in place by a nut 54' which threads onto a stud bolt 54 that threads into the housing 1.

Two different embodiments of the valve 13 are shown in Figs. 1, 5, 6 and 7. In the embodiment of Fig. 1 the valve comprises a body 43 provided with a flange 71. This flange bears against a packing ring 52. The valve is secured in position in the housing by a nut 55. In the body 43 a small tube 44, which is closed at its front end and which is open at its rear end, acts as a stem for the valve. From the bottom of the small tube a rod 48 extends axially. Onto this rod 48 is threaded a packing ring 50. At the end of the rod 48 there is fixed a cup 49 which surrounds the ring 50. The ring 50 has an inner diameter smaller than the outside diameter of the small tube 44 and larger than the diameter of the periphery of the valve body 43. A helical spring retains the packing 50 against the front of the valve body 43 insuring tightness. In the side wall of the small tube 44 there is provided at least one transverse hole 57 (Fig. 1) through which the air in the chamber 4 can discharge when the pressure in the tires exceeds the predetermined pressure and forces the member 9 rearwardly against the resistance of the spring 14, carrying the valve 13 with it and pressing the stem 44 inwardly by engagement with the plug 17'.

By shifting the handle 20 (Figs. 1 and 10) to the right of Fig. 10, the plug 17' disengages the packing 50 from its seat by the pressure which the plug 17' exerts on the stem 44, and thus air may be allowed at any time to escape through the hole 57.

A modified form of this valve 13 may be used to connect the signal and control device of this invention with the inner tubes of each of the dual tires. This structure is shown in Figs. 5, 6 and 7. Here, the tube 44 is replaced by a thin plate 44' of general parallelepiped shape, the width of which is equal to the internal diameter of the valve casing 43; and the bottom of the small tube is replaced by a disc 46. This disc has a diameter equal to the diameter of the front hole of valve body 43; and said disc is aligned with and contacts the rod 48, the packing ring 50 and the cup 49. Integral with the rear end of the plate 44' are two circular segments which constitute a seat for the rear end of the spring 51 that serves to retain the valve in closed position.

Fig. 4 illustrates how the air tubes of the tires are connected to the device of the present invention and how the alarm signals are conveyed from this device to the detecting members. The valve of the air tube of the tire 62, for instance, is connected with a small tube 73, the other end of which is introduced into a flexible hose 72' that is connected with the duct 6'. On the small tube 73 there is mounted a winged ferrule 78 which is adapted to be screwed on the rear end 43' of the valve body 43 which is, in turn, connected to the valve of the air tube of the tire 62 by means of another ferrule 69. Tightness is insured by the packing 70 which is held in place during threading up of the ferrule 78. The air tubes of the two tires are inflated by inserting the compressed air supply pipe into the conduit 74 of the housing 1 without any valve, for this housing is connected by means of the chamber 4 with the air tubes of the two tires.

An annular disc 60 (Fig. 4) made of electrical conducting material is mounted on a fixed part of the brake of each wheel but electrically insulated therefrom. Against disc 60 there bears constantly a spring contact piece 59 which slides on the disc 60 during movement of the vehicle. The contact 69 is connected by means of a conducting wire 58 with an adjustable rod 29 mounted in the air-tight chamber 2 of the apparatus as shown in Fig. 1.

Disc 60 itself is connected by means of a conducting wire 68 to an electrical lamp mounted in a dial indicator 64 (Fig. 9) which is secured on the dashboard of the vehicle. This dial indicator comprises a number of lamps equal to the number of dual wheels (wheel pairs) to be controlled. In the instance illustrated in the drawings there are in the dial indicator 64 six lamps marked with the numerals 1 to 6 so that six dual wheels may be connected to the dial indicator. The dial indicator comprises further a switch which is adapted to be actuated by a key 66 that is shaped as a pointer.

When the vehicle is in the garage the pointer 66 may be positioned so that all the signals are broken. When the vehicle is running the pointer 66 may be positioned so that all the visible signalling devices (lamps 1 to 6, Fig. 9) are connected in circuit to the several sets of dual wheels of the vehicle; while, when the vehicle is parked, the switch 66 may be positioned so that not only are the circuits of the visible signalling devices connected to the dual wheels of the vehicles but also an audible alarm, such as the horn or siren of the vehicle, is connected in circuit to the dual wheels so that if a tire becomes deflated while the vehicle is parked the operator of the vehicle is advised thereof not only by lighting of the proper lamp of the dial indicator 64 but also by the sounding of the horn or siren of the vehicle. If the driver is away from the parked vehicle, then, he will be warned audibly of the deflation of a tire. The means for connecting horn or siren in circuit to the dial indicator 64 forms no part of the present invention and therefore is not here described. Such connection is, however, well within the skill of anyone versed in this art.

The operation of the device of the present invention will be understood from the preceding description but may be re-summed up here.

In case one of the tires loses pressure the pressure diminishes also in the sealed chamber 4. Then the spring 14 presses the disc head of the member 9 to cause it to close the inner ends of the ducts 6 and 6' that are in communication with the two tires. The pressure at which this closing off of the ducts 6 and 6' from one another occurs, is determined by the previous adjustment of the spring 14 by means of the handle 20. After the two conduits 6 and 6' are shut off from one another the tubes of the two tires are no longer in direct communication with each other. Hence the tire that is not leaking can go on exerting its function of carrying the vehicle. At the same time that the conduits 6 and 6' are shut off from one another, the head of the member 9 pushes the rod 23 against the rocker 27 (Fig. 1) which in turn forces the spring contact 28 into contact with terminal 29. Spring terminal 28 is secured to metallic housing 1; and metallic housing 1 is grounded on the vehicle by its mounting through projection 77 (Fig. 1) thereon. Hence, when spring contact 28 is engaged with terminal 29 a circuit is closed to the indicator 64 on the dashboard from the battery of the vehicle through the ground thereof, contacts 28 and 29, line 58 (Fig. 4), contact 59, disc 60, and line 68.

In order to find out which of the air tubes is losing pressure the driver grasps the handle 20 (Figs. 1 and 10) of the device which is secured to the pair of dual tires which have been indicated by the dial 64 as losing pressure and moves this handle for an instant to the left in Fig. 10. This, as denoted by the pressure graduations on the upper part of the dial 34, reduces the compression of the spring 14 (Fig. 1). This causes a loosening of the spring 14; and the pressure of air in the good air tube will again move the disc head 9 away from the packings 41 and 41' of the ducts 6 and 6', reestablishing the connection between the air tubes of the dual tires. If the damaged tire is the one connected to the duct 6' the compressed air will flow from the duct 6 to the duct 6' diminishing the pressure to which the pressure gauge 31, which is connected to duct 6, is subjected. Accordingly the pointer 33 (Fig. 10) of the pressure gauge will shift toward the indication of lower pressure. Assuming that the tire which is connected with the duct 6' is the right hand tire of the pair, the indication of lower than normal pressure will indicate that it is the right hand tire which is damaged.

If, vice versa, the damaged tire is the one which is connected with the conduit 6 the air will flow from conduit 6' into conduit 6 as long as the conduits are connected. Communication will, of course, be shut off by the head of member 9 under pressure of spring 14, as soon as the pressure in the two tires falls below the desired value. If, prior to reestablishing communication between the two conduits, the pointer 33 of the pressure gauge was shifting toward pressures lower than normal, then, when communication is reopened between the two tires, by means of releasing the tension on spring 14 by shifting handle 20, there will take place an increase of pressure in the conduit 6 owing to the inflow of compressed air coming from the non-damaged tire through the conduit 6'. Consequently, the pointer 33 will be moved toward higher pressure; and as a result the dial 34 indicates that the damaged tire is the left hand one of the pair.

Fig. 4 illustrates in particular a control and alarm device constructed according to the invention as applied to a dual tire pair mounted on one of the front steering axles of a vehicle. Doubling the number of tires on the steering wheels is particularly advantageous if one of said tires has an external diameter smaller than the other one, that is to say, does not touch the ground as long as the tire having a larger diameter is fully inflated. In such case, under normal conditions only the tire 63 is subjected to possible damage. If that tire should start to leak, however, the apparatus of the present invention will break communication between the two tires and while the tire 63 is flat the tire 62 will take the load and insure control of the vehicle for the driver. The device of the present invention permits this, while giving the alarm and designating the leaking tire.

Having thus described my invention, what I claim is:

1. A tire deflation control and signal device for dual tires of automotive vehicles, comprising a housing having a first chamber therein, a pair of ducts in said housing, each of which is connectable at one end with one of said tires and each of which communicates at its opposite end with a port in said first chamber to conduct compressed air between said first chamber and said tires in either direction, the ports for the two ducts being separate and spaced from one another, a closure member reciprocable in said first chamber, spring means for constantly urging said member in one direction in said first chamber toward a position closing off said ports from communication with each other and with said first chamber when the air pressure in said first chamber falls below a predetermined value, a third duct communicating with said first chamber and connectable to a pump for supplying compressed air to said first chamber, means adjustable on said housing for adjusting the compression of said spring means, said housing having a second chamber therein and a wall between said chambers, a pair of electrical terminals mounted in said second chamber, one of which is resilient and is normally out of contact with the other thereby breaking the circuit between them, an electrically-operated signal device mounted in said housing and connected to said terminals to be actuated upon contact of said terminals with one another, a rod slidable in a hole in said wall and having one end in engagement with said closure member, said rod being operatively connected at its other end with said one terminal to move said one terminal into contact with the other terminal to actuate said signal when communication between the two first-named ducts is shut off by said closure member, a fourth duct communicating with said first chamber for evacuating air from said first chamber, a valve in said housing for normally closing said fourth duct, and resilient means for constantly urging said valve to closed position to maintain said valve closed when the air pressure in said first chamber is below a predetermined value.

2. A tire deflation control and signal device for dual tires of automotive vehicles, comprising a housing having a first chamber therein, a pair of ducts in said housing, each of which is connectable at one end with one of said tires and each of which communicates at its opposite end with a port in said first chamber to conduct compressed air between said first chamber and said tires in either direction, the ports for the two ducts being separate and spaced from one another, a closure member reciprocable in said first chamber, spring means for constantly urging said member in one direction in said first chamber toward a position closing off said ports from communication with each other and with said first chamber when the air pressure in said first chamber falls below a predetermined value, a third duct communicating with said first chamber and connectable to a pump for supplying compressed air to said first chamber, means adjustable on said housing for adjusting the compression of said spring means, said housing having a second chamber therein and a wall between said chambers, a pair of electrical terminals mounted in said second chamber, one of which is resilient and is normally out of contact with the other thereby breaking the circuit between them, an electrically-operated signal device mounted in said housing and connected to said terminals to be actuated upon contact of said terminals with one another, a rod slidable in a hole in said wall and having one end in engagement with said closure member, said rod being operatively connected at its other end with said one terminal to move said one terminal into contact with the other terminal to actuate said signal when communication between the two first-named ducts is shut off by said closure member, said closure member having a duct therein which communicates with said first chamber for evacuating said first chamber, a valve reciprocally mounted in said closure member for normally closing the last-named duct, and resilient means carried by said closure member and engaging said valve to constantly urge said valve to closed position to maintain said valve closed when the air pressure in said first chamber is below a predetermined value.

References Cited in the file of this patent

UNITED STATES PATENTS

| | | |
|---|---|---|
| 1,849,139 | Denmire | Mar. 15, 1932 |
| 2,119,287 | Pratt | May 31, 1938 |
| 2,135,303 | Greene | Nov. 1, 1938 |
| 2,334,443 | Schubert | Nov. 6, 1943 |
| 2,362,883 | Cecil | Nov. 14, 1944 |
| 2,463,335 | Warnhuis | Mar. 1, 1949 |

FOREIGN PATENTS

| | | |
|---|---|---|
| 421,148 | Great Britain | Dec. 14, 1934 |